UNITED STATES PATENT OFFICE.

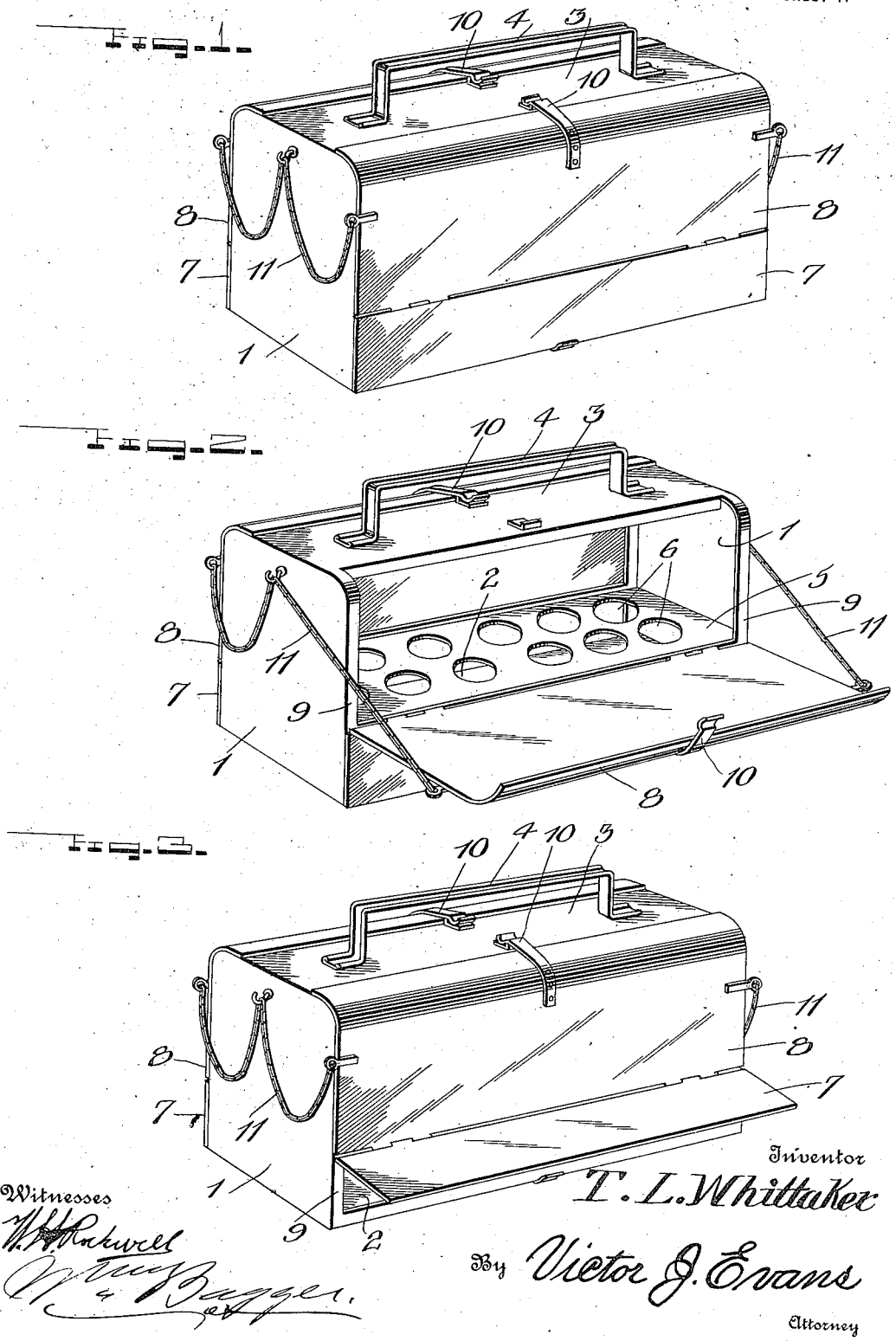

THOMAS L. WHITTAKER, OF BIRMINGHAM, ALABAMA.

ICE-CREAM-CONE TRAY.

1,165,304.

Specification of Letters Patent.

Patented Dec. 21, 1915.

Application filed January 15, 1915. Serial No. 2,451.

*To all whom it may concern:*

Be it known that I, THOMAS L. WHITTAKER, a citizen of the United States, residing at Birmingham, in the county of Jefferson and State of Alabama, have invented new and useful Improvements in Ice-Cream-Cone Trays, of which the following is a specification.

This invention relates to trays or receptacles for vending ice cream in cones and similar confections and drinks in cones, glasses or dishes, and it has for its object to produce a simple, efficient and sanitary device of this character.

A further object of the invention is to produce a simple vending tray or receptacle for ice cream cones and similar confections, the interior of which shall be conveniently accessible from either side, so that the receptacle may be replenished and the contents removed conveniently and without danger of being bruised or injured.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings, Figure 1 is a perspective view showing the improved vending tray closed. Fig. 2 is a perspective view showing the vending tray or receptacle with one side open for the purpose of dispensing the contents. Fig. 3 is a perspective view of the device with one of the lower doors thrown open for cleaning purposes. Fig. 4 is a longitudinal vertical sectional view of the device. Fig. 5 is a vertical transverse sectional view taken on the line 5—5 in Fig. 4. Fig. 6 is an end view showing the casing closed.

Corresponding parts in the several figures are denoted by like characters of reference.

The receptacle or casing which constitutes the improved vending and dispensing device is composed of end members 1, 1, a bottom member 2 and a longitudinal strip or top member 3 which is connected with the upper edges of the end members and which is provided with a suitable handle 4. Extending longitudinally through the casing and supported on the end members thereof is a shelf 5 which has been shown as being provided with two rows of apertures 6 for the reception of ice cream cones, glasses or dishes which may thus be conveniently and safely supported. Hingedly supported adjacent to the side edges of the shelf 5 are downwardly extending doors 7 and upwardly extending side doors 8; the latter affording closures for the interior space of the casing above the shelf 5, while the doors 7 constitute closures for the interior space below the shelf 5. The top strip 3 is of less width than the bottom 2 of the casing, and the upper corners of the end members 1 are rounded, as shown, the upper portions of the doors 8 being correspondingly curved so as to lap over the said rounded corners. The said doors are made of such dimensions as to form closures sufficiently tight to prevent the entrance of dust and other impurities, and to facilitate the formation of tight closures the end members of the casing are preferably provided with flanges 9 that extend beneath and serve to support the ends of the upper and lower door members. Latches 10 of simple construction are provided for the purpose of retaining the several door members in closed or obstructing position. The upper door members at the two sides of the casing afford convenient access to either side for the purpose of removing the contents. Flexible connecting members, such as chains 11, are used to connect the upper door members 8 with the end members 1 for the purpose of limiting the outward movement of said door members. The contents of the casing may be attractively displayed by opening one of the upper doors, and the contents may be conveniently removed without bruising and without unnecessarily handling the same. The entire device is simple, compact, convenient, clean and sanitary for the purposes set forth. Convenient access may be had to the lower portion of the casing through the lower doors 7 for the purpose of cleaning and airing the same.

Having thus described the invention, what is claimed as new, is:—

1. A dispensing and vending device comprising a receptacle including end members, a bottom member and a relatively narrow top member, said end members having rounded upper corners, a shelf supported on the end members, and upwardly and downwardly extending doors supported hingedly adjacent to the side edges of the shelf, the upwardly extending doors being bent to lap over the rounded corners of the end members.

2. A vending receptacle including end members, a bottom member and a relatively narrow top member having a handle, said end members having rounded upper corners, and flanges at their side edges, a shelf supported on the end members, upwardly and downwardly extending doors supported hingedly adjacent to the side edges of the shelf and engaging the flanges on the end members, and means for limiting the opening movement of the upwardly extending door members.

In testimony whereof I affix my signature in presence of two witnesses.

THOMAS L. WHITTAKER.

Witnesses:
GEO. HALL,
JOHN HALL.